Patented Dec. 28, 1948

2,457,484

UNITED STATES PATENT OFFICE 2,457,484

SUBSTITUTED PYRIDINE COMPOUND

John Halley Mowat, Pearl River, N. Y., assignor, by mesne assignments, to American Cyanamid Company, New York, N. Y., a corporation of Maine No Drawing. Application February 7, 1944,
Serial No. 521,431

5 Claims. (Cl. 260—295)

This invention relates to a new chemical compound, more particularly, to a substituted pyridine, a useful intermediate in the preparation of vitamin $B_6$, and to a process of preparing the same.

The compound of the present invention may be represented by the following formula:

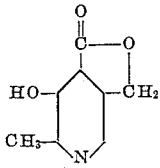

Preparation of this compound will be illustrated in detail by means of the following specific example.

A solution of 0.25 g. of 2-methyl-3-amino-4-carbethoxy-5-cyano-6-chloropyridine in 150 cc. of methanol containing 1 g. of hydrogen chloride was added, during 18 hours, to a suspension of 1 g. of reduced palladium chloride in 25 cc. of methanol and 2.5 cc. of water. The catalyst was filtered off, the solvent was distilled in vacuo from the filtrate (bath temperature, 40° C.), the oily residue was dissolved in a little methanol; and the solution, diluted with ether, deposited the dihydrochloride which was recrystallized from a glacial acetic acid-ether solution. The dihydrochloride did not melt below 325° C., nor was there evidence of change at this temperature.

It is understood that any 4-carboxy-6-halopyridine may be used so long as the other essential groupings are present on the pyridine ring. For example, the ethyl ester may be replaced by any other suitable ester of 2-methyl-3-amino-4-carboxy-5-cyano-6-halopyridine. Among the various esters that may be utilized in addition to the ethyl, are those such as the methyl, butyl, amyl, hexyl, phenyl, naphthyl, benzyl, cinnamyl, cyclohexanol, furfuryl, tetrahydrofurfuryl, and the like. Similarly, it is understood that the corresponding esters of 2-methyl-3-amino-4-carboxy-5-cyano-6-bromopyridine may be used instead of the 6-chloropyridine.

A solution of 0.7 g. of sodium nitrite in 5 cc. of water was added dropwise to a solution of 0.7 g. of the dihydrochloride of 2-methyl-3-amino-4-carbethoxy-5-aminomethyl pyridine and 0.87 cc. of concentrated sulfuric acid in 10 cc. of water. After 20 minutes at 0° C., the solution was added dropwise to a boiling solution of 1 cc. of concentrated sulfuric acid in 15 cc. of water (boiling discontinued after 15 minutes). The cooled solution was then neutralized with a 30% solution of alkali. The filtered solution was decolorized with active charcoal and evaporated to dryness in vacuo. The dry residue was extracted with five portions of boiling ethanol, the extract was decolorized with active charcoal and evaporated to dryness in vacuo. The residue was suspended in 5 cc. of absolute ethanol, the solid was collected by centrifuging, and a portion of the product was recrystallized from methanol to give the lactone of 2-methyl-3-hydroxy-4-carboxy-5-hydroxymethyl pyridine. The product decomposed at 255–260° C. when heated.

The term "deamination" as used hereinafter refers to the replacement of an —$NH_2$ group by an —OH group. In the deamination step described above the hydrobromide salt may be used, but the hydrochloride salt is preferred because of its cheapness and ease of preparation. Similarly, sodium nitrite and sulfuric acid may be replaced by other suitable nitrous acid-forming materials, such as for example, potassium nitrite and hydrochloric acid. The diazotization may also be effected by using amyl nitrite in the usual way.

The lactone of 2-methyl-3-hydroxy-4-carboxy-5-hydroxy-methyl pyridine can be converted to vitamin $B_6$ by heating on a water bath with 30 per cent hydrochloric acid and granulated tin for about an hour. The solution is evaporated to dryness and the residue dissolved in water and treated with hydrogen sulfide to remove the tin. The filtrate is again evaporated to dryness, and the vitamin $B_6$ hydrochloride is recrystallized from alcohol.

It is obvious that the above description is intended to be illustrative only and that the process may be varied or modified to a considerable extent within the skill of those in the art without departing from the spirit of the invention.

What I claim is:

1. The process of producing the lactone of 2-methyl-3-hydroxy-4-carboxy-5-hydroxymethyl pyridine which comprises mixing together 2-methyl-3-amino-4-carbethoxy-5-aminomethyl pyridine, an alkali metal nitrite and an acid and thereafter heating the mixture and recovering the thus formed lactone of 2-methyl-3-hydroxy-4-carboxy-5-hydroxymethyl pyridine.

2. The process of producing the lactone of 2-methyl-3-hydroxy-4-carboxy-5-hydroxymethyl pyridine which comprises heating 2-methyl-3-amino-4-carbethoxy-5-aminomethyl pyridine with sodium nitrite and sulfuric acid and recovering the thus formed lactone of 2-methyl-3-hydroxy-4-carboxy-5-hydroxymethyl pyridine.

3. In the synthesis of vitamin $B_6$, the step which comprises heating the dihydrochloride of 2-methyl-3-amino-4-carbethoxy-5-aminomethyl pyridine with potassium nitrite and hydrochloric acid and recovering the thus formed lactone of 2-methyl-3-hydroxy-4-carboxy-5-hydroxymethyl pyridine.

4. The process of producing the lactone of 2-methyl-3-hydroxy-4-carboxy-5-hydroxymethyl pyridine which comprises mixing a compound from the group consisting of 2-methyl-3-amino-4-carbethoxy-5-aminomethyl pyridine and its acid salts with sodium nitrite and sulfuric acid at about 0° C., adding by increments to a boiling acid solution, heating until the reaction is substantially complete, cooling, neutralizing and recovering the thus formed lactone of 2-methyl-3-hydroxy-4-carboxy-5-hydroxymethyl pyridine.

5. A compound of the formula

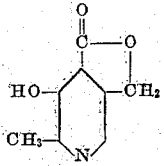

JOHN HALLEY MOWAT.

REFERENCES CITED

The following references are of record in the file of this patent:

UNITED STATES PATENTS

| Number | Name | Date |
|---|---|---|
| 2,248,078 | Harris | July 8, 1941 |
| 2,310,167 | Carlson | Feb. 2, 1943 |
| 2,359,260 | Szabo | Sept. 26, 1944 |
| 2,344,318 | Westphal | May 23, 1944 |
| 2,325,053 | Harris | July 27, 1943 |

OTHER REFERENCES

Science Papers, Instit. of Phys. & Chem. Research (Tokyo), vol. 38 (1941), pp. 347–52.

J. Amer. Chem. Soc. (May 1939), p. 1245.